United States Patent Office 3,453,409
Patented July 1, 1969

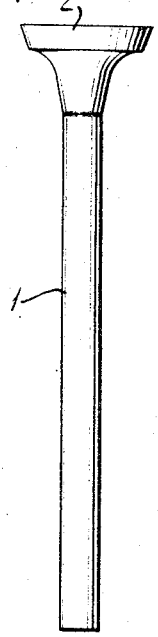
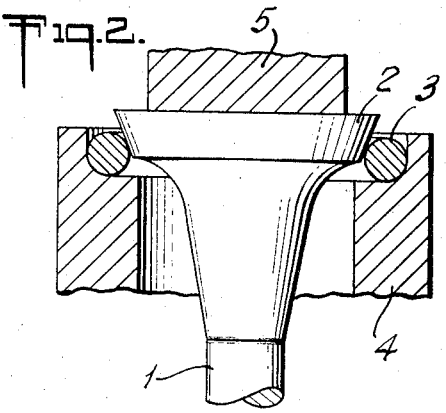
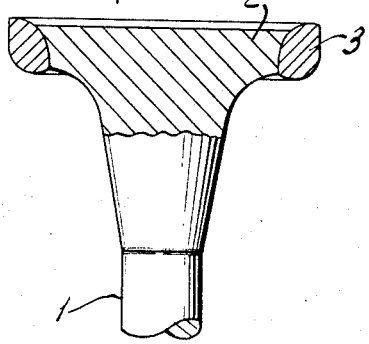
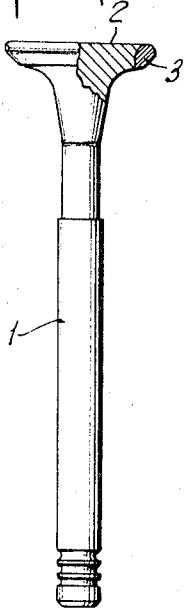
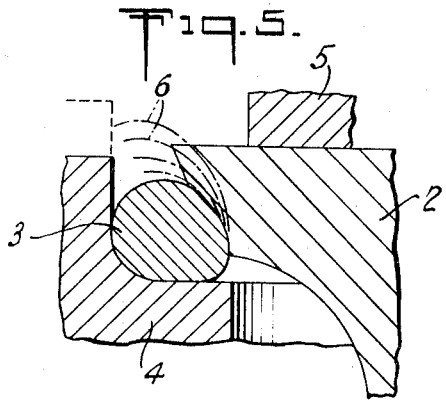

3,453,409
METHOD OF ARMORING VALVE CONES BY ELECTRIC WELDING
Franz Schober, Munich-Obermenzing, Germany, assignor to Bayerisches Leichtmetallwerk Graf Blucher von Wahlstatt K.G., Munich, Germany
Filed Mar. 26, 1965, Ser. No. 443,132
Claims priority, application Germany, July 8, 1964, B 77,582; Nov. 26, 1964, B 79,507
Int. Cl. B23k 9/04; B23j 11/14
U.S. Cl. 219—76
5 Claims

ABSTRACT OF THE DISCLOSURE

The head of a valve for internal combustion engines is armored by armoring material being put in linear contact with the valve head. Intermittent welding current and pressure are applied for deforming portions of the armoring material and of the valve head by slidably moving the armoring material in the direction of the axis of the valve, while the armoring material and portions of the valve head are in a plastic condition.

---

The invention relates to a method of armoring valve cones for internal combustion engines, in which a round body made of armoring material is joined to the valve head.

It is known to provide valve cones, and particularly those of exhaust valves of internal combustion engines, with corrosion- and heat-resistant bearing surfaces by applying thereto an armoring material by welding. The conventional method of applying the armoring material by fusion with the aid of a welding flame is a time-consuming operation which, owing to the unavoidable heating of the entire valve head to a high temperature, causes warping of the valve.

Moreover, it cannot be avoided that an excessive amount of high-quality, costly armoring material is used, since layers of armoring material applied by fusion show substantial irregularities of shape which have to be removed subsequently by a material-removing treatment.

On the other hand, it has been proposed to join prefabricated rings of armoring material by electric surface-pressure welding to the valve heads having a shape matching that of the rings. This method of joining failed in practice, because by this method it is impossible to obtain a uniform and satisfactory welded joint over the whole area of the weld without inclusion of oxide layers and the like.

It is the object of the present invention to provide a method of armoring valve cones for internal combustion engines, avoiding the disadvantages of hitherto known processes.

In accordance with one of the major features of the invention, prior to the welding operation, the outer periphery of the valve head is provided in the form of a tapered, preferably conical solid of revolution, with the smaller diameter of the solid turned preferably towards the stem side of the valve head. An annular body made of armoring material is placed upon the solid of revolution in such a manner that the shaped body contacts the solid substantially linearily in the area of the smaller diameter thereof. The shaped body of armoring material is, itself, in surface contact with the associated electrode.

During the subsequent welding process, the shaped body is thrust on to the widening part of the valve head, resulting in plastic deformation of both parts. The shaped body made of armoring material and the corresponding part of the valve head are both converted into the plastic state during the welding process, so that the two parts are homogeneously joined by the pressure applied, as the ring or annular body is thrust on to the valve head.

Owing to the thrust motion performed during the electric welding process, an intimate and perfect welded joint may be obtained, without inclusion of an oxide film or cinders, by the method according to the invention. Moreover, the outer shape of applied armoring material results, within narrow tolerances, from the shape of the associated electrode. Exactly proportioned quantities of armoring material can thus be used, so that the loss of material due to melting losses unavoidable in welding is reduced to the minimum. In the subsequent material-removing finishing treatment, the loss due to overmeasure or overdimensioning is substantially less than in the known methods in which the armoring material is applied by fusion with the aid of a welding flame.

It is an essential prerequisite of a satisfactory welding process that, prior to the welding, the shaped body of armoring material should contact the cone of the valve head practically linearly, and its other side should contact the electrode over the largest area possible. The welding heat is thus generated only locally in the required area of weld.

This implies that a high electrical transfer resistance occurs at the point of linear contact between the shaped body and the valve head, so that this area becomes strongly heated, and the deformation commences at that point. On the other hand, a substantially reduced resistance, and thus less heat are produced on the other side of the shaped body, on which side it has surface contact with the electrode, so that the deformation of this part of the shaped body does not commence until later. The shaped body can thus be thrust on to the pre-shaped conical valve head during the welding process.

The peripheral area of the valve head has preferably the shape of a truncated cone, but it may also be constructed as a solid of revolution decreasing in diameter according to a curve.

The electrodes may be cooled in a known manner.

The valve head is concentrically heated over the entire periphery simultaneously, warping being thus substantially avoided.

In the method according to the invention, the welding may be initially uneven due to the fact that the shaped body unevenly contacts the valve head. This is due, for example, to inaccuracies of manufacture or to accumulation of dirt. The reason for this phenomenon is that welding starts at the point of satisfactory contact made between the parts to be welded together, whereas the remaining area is still unheated.

Various areas of the welded joint are thus unevenly heated with overheating resulting therefrom. This results in the structure of the material being overheated in the area of initially satisfactory contact, and in a faulty welding with inclusion of dirt accumulation in the remaining area.

There is, moreover, the risk of the costly high-quality armoring material being burnt off, spattered, or flowing off at the endangered portions.

These disadvantages may be avoided by using intermittent current pulses for the welding, and by applying simultaneously a substantially uniform force to the ring to be applied by welding, the pressure being in the direction of the valve area that is to be armored. Depending upon the construction of the resistance welding apparatus used which, as such, is known, the pressure may be applied by the electrode containing the ring in the direction of the electrode of the valve head, or in the reverse sense.

By this step it is ensured that overheating is safely avoided in those areas where the contact made between the parts to be united by welding is initially satisfactory. Plastic adjustment of the ring of armoring material to the valve head is achieved during the first few current pulses, and inaccuracies of manufacture of both parts are completely equalized. Perfectly uniform welding is then obtained over the whole periphery of the valve by additional current pulses. A perfect weld is obtained even with blanks which may be noncircular or out of true within certain limits and have thus rough tolerances.

The current pulses used for electric resistance welding may be generated at regular intervals, and may also be used in the form of pulses the duration of which may increase or decrease during the welding process. The exact determination of the time intervals between the pulses depends upon the force applied and the properties of the materials which are to be welded together. It will be understood that the force applied to the welded joint during the welding process may also be varied. The ring made of armoring material and/or the valve head may be preheated in known manner prior to the welding.

The welding process according to the invention is completed within a few seconds, and thus affords the additional substantial advantage of requiring less time than the known methods of application.

The shaped body of armoring material that is to be placed upon the valve head may be of a circular, polygonal, or any other cross-section. Its construction should, however, be such as to ensure that it contacts the valve cone substantially linearly, and that its outside shape corresponds substantially to that of its electrode. The welding method according to the invention permits an exactly concentric application of the armoring material so that a relatively thin layer of material may be applied without the risk of its destruction by the subsequent material-removing treatment. This is an additional advantage of the method according to the invention.

Other objects and advantages of the invention will be appreciated and more fully understood with reference to the following detailed description, when considered with the accompanying drawings, wherein:

FIG. 1 shows a valve before application of the armor;

FIG. 2 shows a portion of the same valve on an enlarged scale together with the annular body of armoring material, and the respective electrodes prior to the welding process;

FIG. 3 shows the same valve portion, partly sectioned, after the welding process according to the invention;

FIG. 4 shows the entire valve after a material-removing finishing treatment;

FIG. 5 shows a valve portion together with the ring of armoring material and the electrodes during the welding process;

Figure 6:
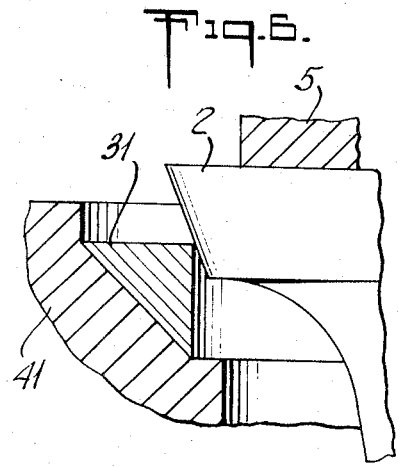
FIG. 6 shows an alternative valve embodiment in which the shaped body of armoring material is of triangular cross-section.

In the drawings, FIG. 1 shows a valve 1 in which the outer periphery of the valve head 2 has a conical shaped.

FIG. 2 shows the same valve 1 on an enlarged scale. A ring 3 of armoring material contacts the valve head 1 in such a manner as to contact the area of the smaller diameter of the cone. Due to inaccuracies of manufacture, particularly those of the ring 3, the latter may in some cases contact the valve cone at a few points only instead of uniformly and linearly around the whole valve head.

The outer surface of the ring 3 rests in an electrode 4. Another electrode 5 contacts the base of the valve head 2. During the welding process the current, which may be intermittent, thus flows across the electrodes 4 and 5 through the valve head 2 and the ring 3. With intermittent current flow, the welding heat will develop first at the points of contact between the ring 3 and the valve head 2, thus permitting plastic adjustment of the parts with respect to each other, under the action of pressure applied during the first few current pulses.

The final welding then proceeds uniformly over the whole periphery of the valve. During the first few current pulses, the ring 3 can adjust itself effectively to an appropriate recess in its electrode 4 so that a satisfactory passage of current is obtained.

FIG. 3 shows the valve 1 after the welding process. The ring 3, which has been thrust onto the valve head 2 during the welding process, is welded securely thereto over the whole periphery thereof, as the sectioned portion shows. The outer contour of the ring 3 then corresponds exactly to the recess in the electrode 4. The subsequent material-removing finishing treatment can thus be started from a blank with narrow tolerance, that need only be slightly overdimensioned.

FIG. 4 shows the valve 1 after the material-removing finishing treatment of the armored valve head 2.

FIG. 5 shows the valve head 2 and the armoring ring 3 during the welding process. The adjustment between ring and valve head is complete, and the actual welding process has started. The dash-and-dot lines 6 show the further progress of the welding process.

FIG. 6 shows a further embodiment in which a ring 31 of armoring material is used which is of triangular cross-section. Rings of this shape, and the shape of a corresponding electrode 41, give a particularly thin, but nevertheless adequate coat of armoring material so that a substantial saving in high-quality armoring material is obtained.

Figure 7:
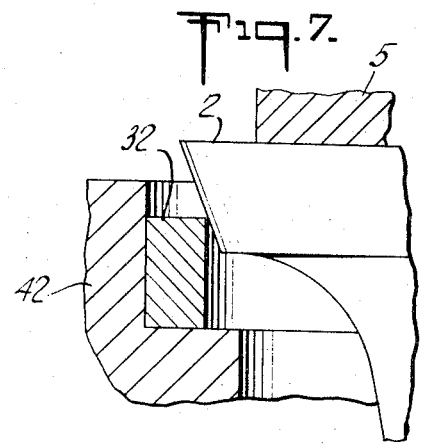
FIGS. 7 and 8 shows two further modifications in which shaped bodies of rectangular cross-section are used.
Figure 8:
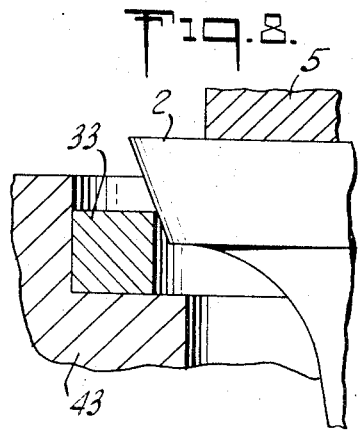

FIG. 7 shows a further modification in which a ring 32 of rectangular cross-section is used, and FIG. 8 shows, by way of example, another ring 33 of armoring material of square cross-section in conjunction with corresponding electrodes 42 and 43, respectively.

The last three drawings, namely FIGS. 6–8, demonstrate the large number of modifications available within the scope of the invention.

The foregoing disclosure relates only to preferred embodiments of the valves made according to the invention, which is intended to include all changes and modifications of the examples described within the scope of the invention as set forth in the appended claims.

I claim:

1. A process for armoring valves for internal combustion engines having a continuously tapering head portion by bringing an annular body of armoring material in linear contact with the portion of the valve head to be armored and by joining the body and the valve head by electric resistance welding in which two electrodes are used and by applying a force against the parts to be joined, the outside circumferential portion of said annular armoring material and said valve being in surface contact with said electrodes, respectively, and the inside circumferential portion of said annular body having a single contact line projecting against said tapering head portion, comprising the steps of bringing the inside circumferential line of said annular body of armoring material circumferentially in contact with the continuously tapering valve head in the region of the smaller diameter thereof; applying welding current to the two parts being in linear contact, said welding current being applied in intermittent current pulses and the duration of said pulses being increased towards the end of the welding period, to compensate for the increase of the contact area of the parts to be welded; and slidingly moving the annular body by application of force, axially in the direction of the larger diameter of the tapering valve head thereby deforming portions of the annular body and of the valve head closest to their contact while they are plastic due to the action of said welding current and force and the deformation of the outer portion of said annular body being controlled by the shape of the electrode being in contact therewith.

2. A process of armoring valves as defined in claim 1 wherein the said valve head has a frustoconical shape.

3. A process of armoring valves as defined in claim 1 wherein the annular body has a circular cross-section to provide said circumferential, substantially linear contact between said body and said valve head.

4. A process of armoring valves as defined in claim 1 wherein the annular body has a polygonal cross-section to provide said circumferential, substantially linear contact between said body and said valve head.

5. A process of armoring valves as defined in claim 1 wherein the annular body is clamped in position during the welding process and the relative movement of the annular body and the valve is being achieved by application of force against the valve.

References Cited

UNITED STATES PATENTS

| | | | |
|---|---|---|---|
| 1,101,858 | 6/1914 | Lachman | 219—93 X |
| 2,202,405 | 5/1940 | Smith | 219—107 |
| 2,216,329 | 10/1940 | Stansbury | 219—111 X |
| 2,231,480 | 2/1941 | Pilger | 219—107 X |
| 2,488,899 | 11/1943 | Cooper et al. | 219—100 X |
| 2,653,210 | 9/1953 | Becker et al. | 219—9.5 |
| 2,826,674 | 3/1958 | Peras | 219—111 X |
| 2,903,564 | 9/1958 | Carr | 219—93 |

FOREIGN PATENTS 707,555  4/1954  Great Britain.

ANTHONY BARTIS, *Primary Examiner.*

R. E. STAUBLY, *Assistant Examiner.*

U.S. Cl. X.R.

219—93, 118, 152